US009523444B2

(12) United States Patent
Shishido

(10) Patent No.: US 9,523,444 B2
(45) Date of Patent: Dec. 20, 2016

(54) FLOW RATE CONTROL DEVICE

(71) Applicant: SMC KABUSHIKI KAISHA, Chiyoda-ku (JP)

(72) Inventor: Kenji Shishido, Adachi-ku (JP)

(73) Assignee: SMC KABUSHIKI KAISHA, Chiyoda-ku (JP)

( * ) Notice: Subject to any disclaimer, the term of this patent is extended or adjusted under 35 U.S.C. 154(b) by 107 days.

(21) Appl. No.: 14/402,429

(22) PCT Filed: Apr. 10, 2013

(86) PCT No.: PCT/JP2013/060867
§ 371 (c)(1),
(2) Date: Nov. 20, 2014

(87) PCT Pub. No.: WO2013/187113
PCT Pub. Date: Dec. 19, 2013

(65) Prior Publication Data
US 2015/0107704 A1    Apr. 23, 2015

(30) Foreign Application Priority Data

Jun. 14, 2012 (JP) ................................ 2012-135013

(51) Int. Cl.
*F16K 37/00* (2006.01)
*F16K 3/24* (2006.01)
(Continued)

(52) U.S. Cl.
CPC ............. *F16K 37/0016* (2013.01); *F16K 1/04* (2013.01); *F16K 3/246* (2013.01); *F16K 31/508* (2013.01); *Y10T 137/8275* (2015.04)

(58) Field of Classification Search
CPC .................................................. F16K 37/0016
(Continued)

(56) References Cited

U.S. PATENT DOCUMENTS 686,966 A  * 11/1901  Grouvelle ........... F16K 37/0016
                                                          137/556.6
1,413,210 A * 4/1922  Gemmel ........... F16K 31/52475
                                                          251/176
(Continued)

FOREIGN PATENT DOCUMENTS

GB    1 271 113    4/1972
JP    16 11049    7/1941
(Continued)

OTHER PUBLICATIONS

International Search Report Issued Jul. 9, 2013 in PCT/JP13/060867 Filed Apr. 10, 2013.

*Primary Examiner* — Craig Schneider
*Assistant Examiner* — Angelisa L Hicks
(74) *Attorney, Agent, or Firm* — Oblon, McClelland, Maier & Neustadt, L.L.P.

(57) ABSTRACT

A flow rate control device is provided with a flow rate adjustment indication device for operating the displacement of a needle valve relative to a flow passage. The flow rate adjustment indication device is provided with a housing, a rotation transmission member which displaces the needle valve by rotational operation, and an annularly shaped indication ring which has a hole through which the rotation transmission member is inserted. The indication ring has graduations which indicate a change in the flow rate of liquid. The engagement of the engagement section of the needle valve displaces the indication ring in the circumferential direction and changes the position of the graduations.

5 Claims, 9 Drawing Sheets

(51) Int. Cl.
*F16K 1/04* (2006.01)
*F16K 31/50* (2006.01)

(58) Field of Classification Search
USPC .......... 137/553, 556, 556.6, 315.28, 315.35; 251/248, 249, 250.5, 288
See application file for complete search history.

(56) References Cited

U.S. PATENT DOCUMENTS

| | | | | |
|---|---|---|---|---|
| 1,561,271 A * | 11/1925 | Morlok | ................ | B67D 1/1405 137/625.42 |
| 3,063,307 A * | 11/1962 | Stvan | ...................... | F16K 31/53 251/250.5 |
| 3,428,291 A * | 2/1969 | Callahan, Jr. | ........... | F16K 51/02 137/556.3 |
| 5,983,826 A * | 11/1999 | Lohde | ................ | F16K 37/0016 116/277 |
| 2004/0045608 A1* | 3/2004 | Peters | .................... | F16K 31/60 137/552.7 |

FOREIGN PATENT DOCUMENTS

| | | |
|---|---|---|
| JP | 58 196446 | 12/1983 |
| JP | 5 75576 | 10/1993 |
| JP | 2011 43196 | 3/2011 |
| JP | 2011 127629 | 6/2011 |

\* cited by examiner

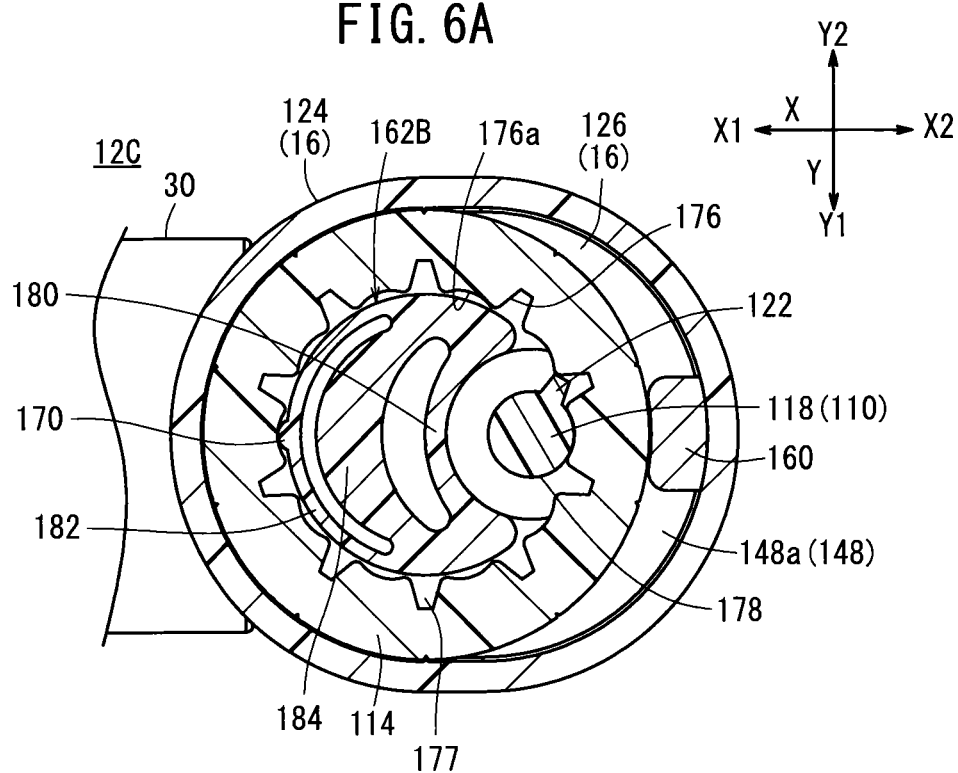
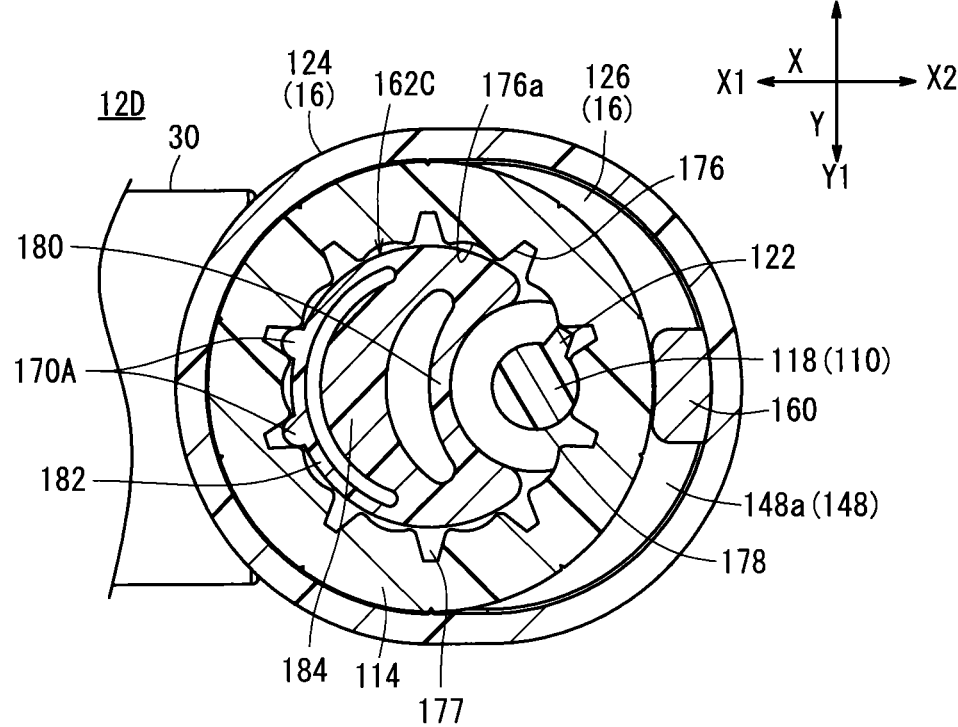

PRESSURE FLUID

FLOW RATE CONTROL DEVICE

TECHNICAL FIELD

The present invention relates to a flow rate control device in which the flow rate of a fluid that flows through the interior thereof is controlled, while indicating a change in the flow rate of the fluid caused by an operation of a user.

BACKGROUND ART

In a pipe through which a fluid such as a gas or a liquid flows, a flow rate control device for controlling the flow rate of the fluid is arranged. For example, as disclosed in Japanese Laid-Open Patent Publication No. 2011-043196, a flow rate control device (flow rate control valve) includes a flow passage disposed in the interior of a valve housing to which a pipe is connected, and the flow passage is opened and closed by a needle valve element. The flow rate of the fluid that flows through the flow passage is controlled by the degree of opening of the needle valve element.

Further, the flow rate control device includes, as a structure for operating the displacement (movement) of the needle valve element, an operating member that is capable of rotating integrally with the needle valve element and on which teeth are formed on a side surface thereof, a gear that is meshed with the teeth, and an indication ring meshed with the gear and having graduations showing the number of rotations of the needle valve element. More specifically, when the user rotates the operating member, a rotational force thereof is transmitted to and rotates the indication ring through the gear, whereby the user can confirm the number of rotations of the needle valve element corresponding to the displacement of the indication ring.

Incidentally, concerning the flow rate control device disclosed in Japanese Laid-Open Patent Publication No. 2011-043196, for minimizing the size thereof, a structure is provided in which the center of rotation of the operating member is matched with the center of rotation of the indication ring, and the gear is interposed between the operating member and the indication ring. However, with this structure, when the indication ring is rotated, the rotational force is transmitted through two gear members, so that the mechanical meshing error is large, and a problem arises in that the indication accuracy is lowered. Further, since the number of parts that make up the flow rate control device is large, there are disadvantages in that the manufacturing cost increases, and further, work efficiency at the time of assembly is reduced.

SUMMARY OF INVENTION

The present invention has been devised as a solution to the aforementioned problems, and has the object of providing a flow rate control device, in which manufacturing costs can be reduced and assembly work can be made more efficient by further simplifying the structure of the indicating portion for indicating the flow rate, and furthermore, in which it is possible to increase the indication accuracy of the flow rate, so that control of the flow rate of the fluid can be carried out more satisfactorily.

For achieving the above objects, a flow rate control device according to the present invention is equipped with a housing, a flow passage disposed in the interior of the housing and through which a fluid can flow, a displacement member, which, by displacement thereof with respect to the flow passage, is capable of controlling the flow rate of the fluid that flows therethrough, and a flow rate adjustment indicating mechanism that operates displacement of the displacement member. The flow rate adjustment indicating mechanism includes a main body portion, a displacement operating member disposed rotatably with respect to the main body portion and connected to the displacement member, and which causes displacement of the displacement member by a rotating operation of the displacement operating member, and a rotating member, which is formed in an annular shape having a hole through which the displacement operating member is inserted, the rotating member being arranged in the main body portion such that the center of rotation of the rotating member is offset with respect to an insertion position of the displacement operating member. Further, the displacement operating member includes an engagement part that is engaged directly with the rotating member under rotation of the displacement operating member. The rotating member has an indicating section by which a change in the flow rate of the fluid is indicated along a circumferential direction thereof. The indicating section is displaced in the circumferential direction by engagement with the engagement part, whereby a position of the indicating section is changed.

In accordance with the above configuration, by arranging the annular-shaped rotating member in the main body portion such that the center of rotation thereof is offset with respect to the insertion position of the displacement operating member, the engagement part of the displacement operating member and the rotating member can easily be placed in direct engagement, and the rotational force of the displacement operating member can be transmitted smoothly to the rotating member. That is, it is unnecessary for another member (for example, a gear) to be interposed between the displacement operating member and the rotating member. Therefore, a meshing error of the displacement operating member with respect to the rotating member can be reduced, and the change in the flow rate of fluid can be indicated with improved accuracy. Further, since the number of parts that make up the flow rate adjustment indicating mechanism can be reduced, manufacturing costs can be reduced and assembly work can be made more efficient. Furthermore, by offsetting the indicating section of the rotating member from the displacement operating member, when the displacement operating member is operated, the indicating section can be confirmed visually from the operating position without interference, and the indicating section can easily be observed while being operated.

In this case, preferably, plural inscribed teeth may be formed along a circumferential direction on an inner circumferential surface of the rotating member that constitutes the hole, and on an outer circumferential surface of the displacement operating member, there may be arranged side-by-side along a circumferential direction a meshing portion, which is enmeshed with the inscribed teeth and serves as the engagement part, and an idling portion, which is not enmeshed with the inscribed teeth.

In the foregoing manner, by arranging side-by-side on the outer circumferential surface of the displacement operating member, the meshing portion, which is enmeshed with the inscribed teeth of the rotating member, and the idling portion, which is not enmeshed with the inscribed teeth, the rotating member is operated only while the meshing portion is enmeshed with the inscribed teeth. Further, in the case that the idling portion is arranged in confronting relation to the inscribed teeth, rotation of the rotating member is stopped, and the flow rate of the fluid can continued to be displayed suitably as a specified value.

Further, a rotation regulating mechanism, which is capable of regulating rotation of the rotating member in a condition in which the idling portion of the displacement operating member is arranged in confronting relation to the inscribed teeth, preferably is disposed on the main body portion.

In the foregoing manner, in the flow rate control device, by providing the rotation regulating mechanism, which is capable of regulating rotation of the rotating member, the rotation-stopped state of the rotating member can be maintained more assuredly, and the indication accuracy of the indicating section can further be improved.

Furthermore, the rotation regulating mechanism may be provided continuously within the main body portion, and may be an elastic regulating member that abuts against the inscribed teeth and elastically presses the rotating member.

In the foregoing manner, by the rotation regulating mechanism being an elastic regulating member that elastically presses the rotating member, an elastic force is applied to the rotating member, whereby rotation thereof can effectively be regulated. Further, the rotating member can easily be rotated, by transmitting an operating force, which overcomes the elastic force of the elastic regulating member, from the displacement operating member to the rotating member. Further, by forming the elastic regulating member continuous in the main body portion, the number of component parts can further be reduced.

Still further, the elastic regulating member preferably includes a projection that is capable of entering recesses formed on inner sides of the inscribed teeth or entering in between the plural inscribed teeth.

In this manner, by the elastic regulating member having the projection that is capable of entering the recesses formed on inner sides of the inscribed teeth or entering in between the plural inscribed teeth, the flow rate control device can more reliably regulate, by the projection, rotation of the rotating member. In addition, when the rotating member is rotated, by displacement of the projection in opposition to the elastic force, rotation of the rotating member can smoothly be performed.

Preferably, the elastic regulating member elastically presses the rotating member on an opposite side across the center of rotation of the rotating member with respect to a position where the displacement operating member is arranged.

In this manner, by the elastic regulating member elastically pressing the rotating member on an opposite side across the center of rotation of the rotating member with respect to the position where the displacement operating member is arranged, the elastic force can be applied so as to cause the rotating member to approach the displacement operating member. Thus, the elastic regulating member can cause the meshing portion of the displacement operating member and the inscribed teeth of the rotating member to engage more reliably, so that the rotating member can be rotated more suitably.

Further, the flow rate adjustment indicating mechanism may be constituted as a unit that is attachable and detachable with respect to the housing.

In this manner, by providing the flow rate adjustment indicating mechanism as a detachable and attachable unit, with a single unit, plural mechanisms for controlling the flow rate of the fluid can be adjusted.

Furthermore, a configuration may be provided in which the main body portion includes an insertion hole in which the housing can be partially inserted, and in a state in which the housing is inserted in the insertion hole, a clip is mounted thereon so as to maintain a connection between the housing and the main body portion.

In this manner, by forming the connection between the housing and the main body portion using the clip, the flow rate adjustment indicating mechanism, which is constituted as a unit, can easily be attached and detached.

According to the present invention, by providing the structure of the indicating portion for indicating the flow rate with a simple configuration, manufacturing costs can be reduced and assembly work can be made more efficient. Furthermore, the indication accuracy of the flow rate can be increased. Consequently, the flow rate control of the fluid can be carried out more satisfactorily.

BRIEF DESCRIPTION OF DRAWINGS

FIG. 6A is a partial cross sectional view showing a third structural example of a flow rate adjustment indicating device;

FIG. 6B is a partial cross sectional view showing a fourth structural example of a flow rate adjustment indicating device;

DESCRIPTION OF EMBODIMENTS

Below, a preferred embodiment of a flow rate control device according to the present invention will be described in detail with reference to the accompanying drawings.

Figure 1:
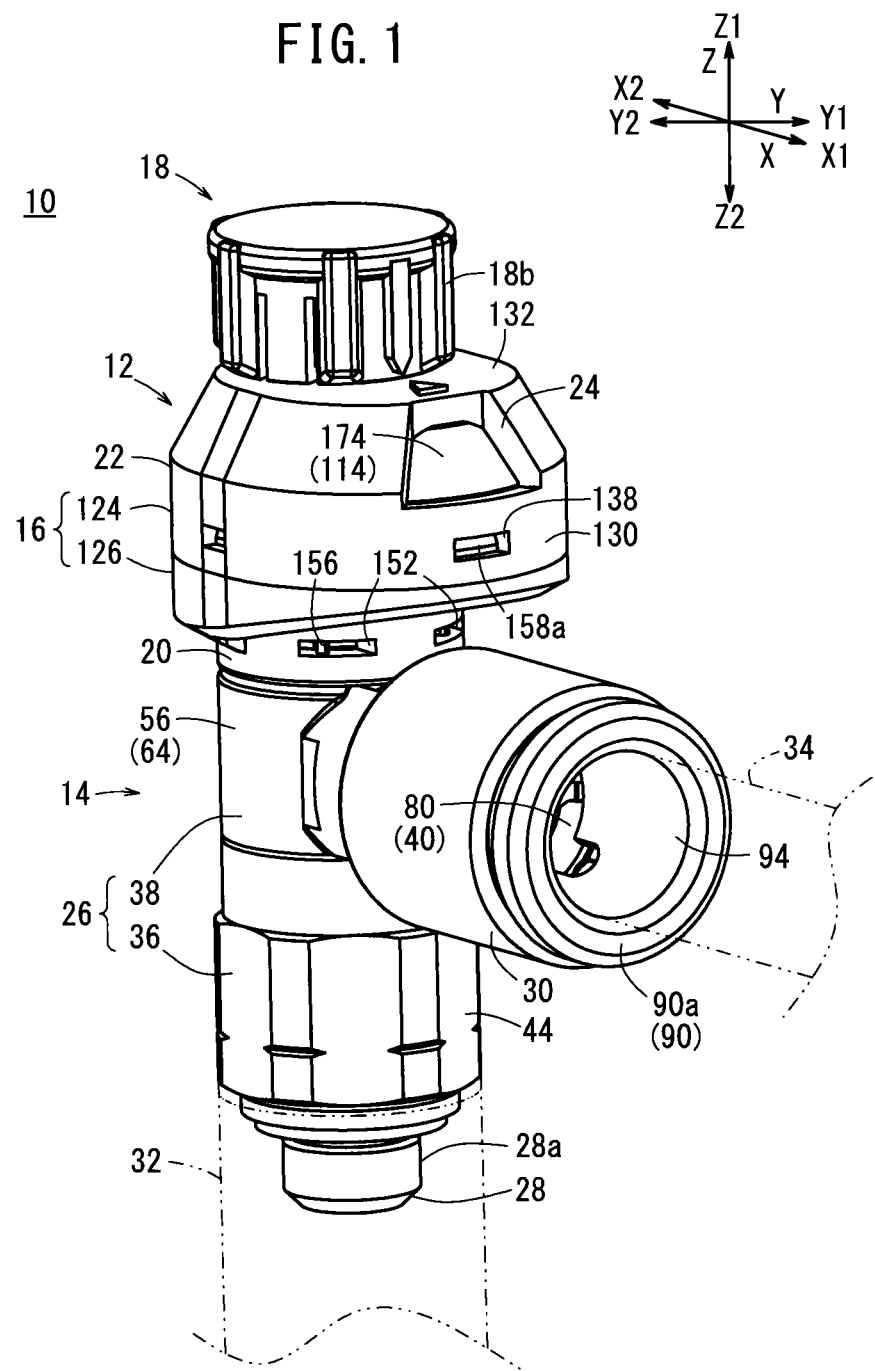
FIG. 1 is a perspective view showing the overall structure of a flow rate control device according to an embodiment of the present invention.
Figure 2:
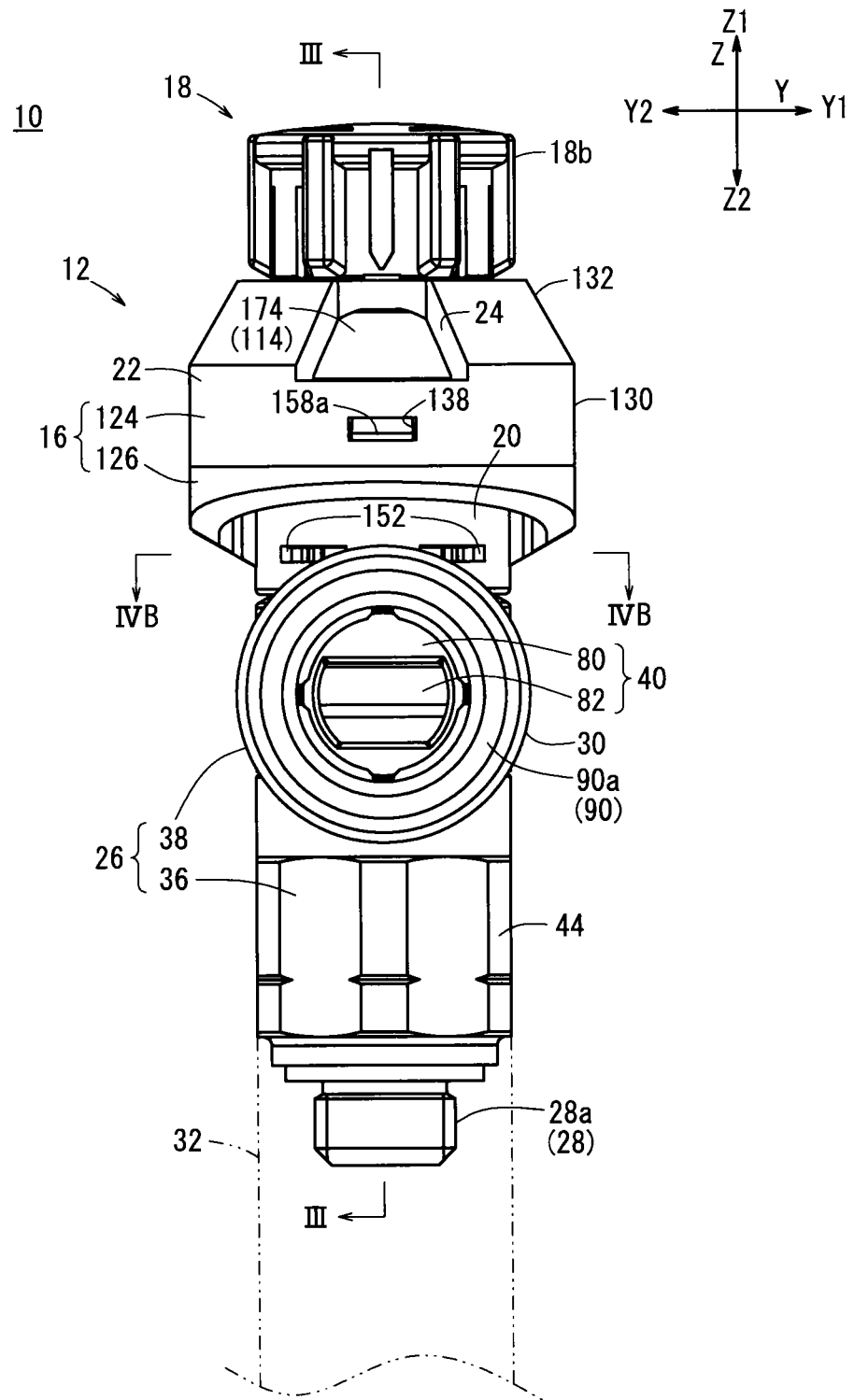
FIG. 2 is a front view of the flow rate control device of FIG. 1.

FIG. 1 is a perspective view showing the overall structure of a flow rate control device 10 according to an embodiment of the present invention, and FIG. 2 is a front view of the flow rate control device 10 of FIG. 1. In the following descriptions, based on the arrow directions shown in FIG. 1, the forward and rearward directions of the flow rate control device 10 are also referred to as X direction (the forward direction is the X1 direction, the rearward direction is the X2 direction), the left and right directions thereof, i.e., widthwise directions, are also referred to as Y direction (the right direction is the Y1 direction, the left direction is the Y2 direction), and the heightwise directions thereof are also referred to as Z direction (the upward direction is the Z1 direction, the downward direction is the Z2 direction). The directional indications are for the purposes of facilitating description, and it is a matter of course that the flow rate control device 10 may be used in any arbitrary orientation.

The flow rate control device 10 according to the present invention is constituted schematically from a flow rate adjustment indicating device 12 (flow rate adjustment indicating mechanism) that makes up an upper side portion of the entire device, and a flow rate control valve 14 that is disposed on a lower side of the flow rate adjustment indicating device 12.

The flow rate adjustment indicating device 12 includes an operating mechanism for adjusting the flow rate of a fluid (e.g., a gas or a liquid) that flows through the interior of the flow rate control valve 14. The flow rate adjustment indicating device 12 includes a casing 16 that houses the operating mechanism of the flow rate control valve 14, and a knob 18 that is attached rotatably on an upper portion of the casing 16. The casing 16 is connected detachably with respect to the flow rate control valve 14.

The casing 16 includes an extension 20 whose outer circumferential surface extends vertically flush with the flow rate control valve 14, and a main mechanism accommodating section 22 that is expanded in diameter in a radial direction while being biased in the X1 direction on the upper portion of the extension 20. The knob 18 is disposed on an upper portion of the main mechanism accommodating section 22, and when the knob 18 is rotated relative to the casing 16 by a user, the flow rate of the fluid in the flow rate control valve 14 is adjusted. Further, a display window 24 is formed on a side surface in the X1 direction of the main mechanism accommodating section 22. In the display window 24, a change in the flow rate of the fluid (i.e., an amount by which the knob 18 is rotated) is displayed. The specific structure of the flow rate adjustment indicating device 12 will be discussed in detail later.

On the other hand, the flow rate control valve 14 includes a housing 26 in which the flow rate adjustment indicating device 12 is mounted. The housing 26 includes a first port 28 on a lower part (Z2 direction) of a body portion that extends upwardly and downwardly, and a second port 30 that extends in the X1 direction on the upper part side of the body portion. More specifically, as viewed from the side, the housing 26 is formed substantially in an L-shape. A first pipe 32 through which a fluid is supplied is connected to the first port 28, and a second pipe 34 through which the fluid is discharged is connected to the second port 30. The direction of flow of the fluid in the flow rate control valve 14 is not particularly limited, and for example, the fluid may be supplied to the second port 30 and discharged from the first port 28.

Figure 3:
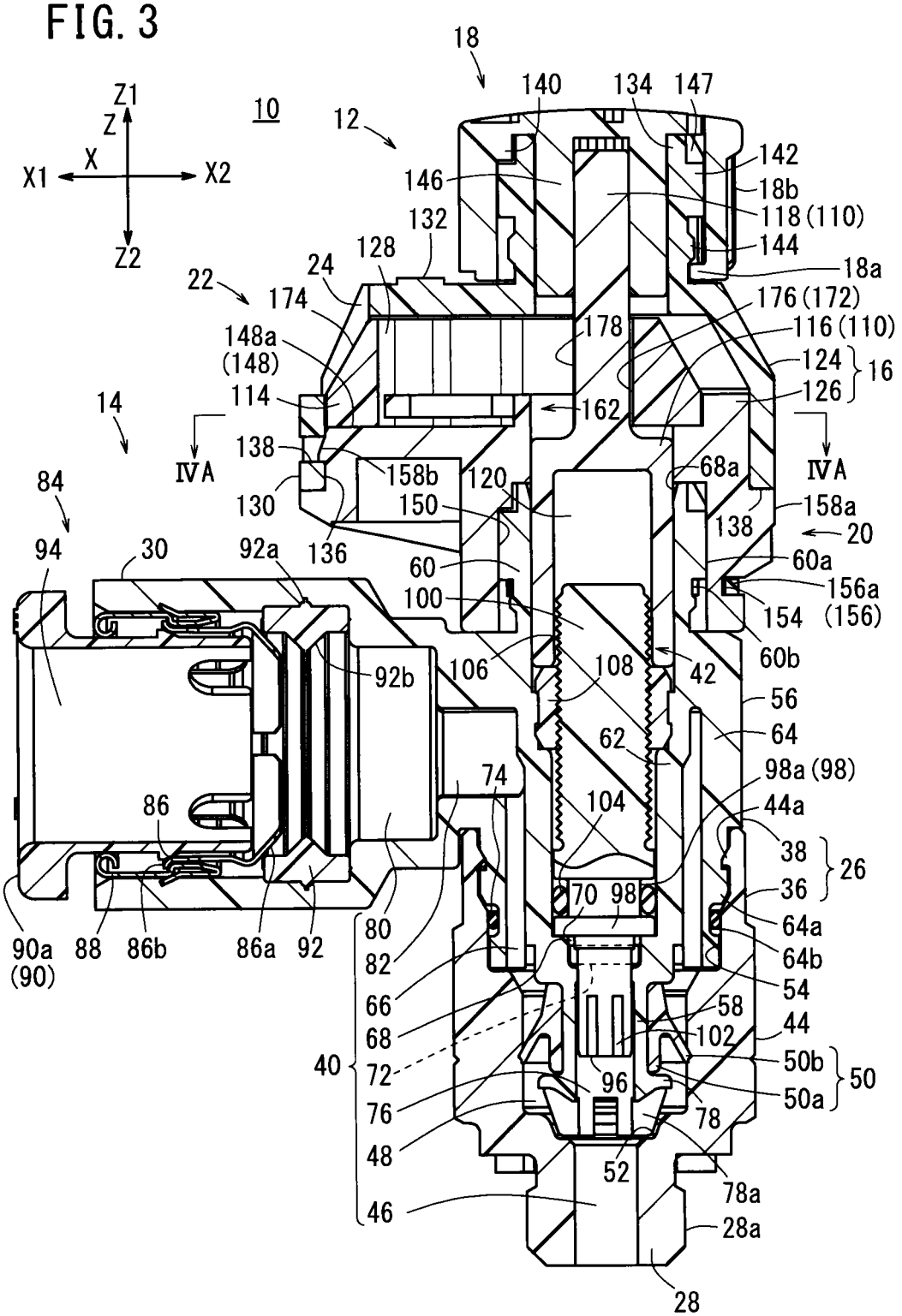
FIG. 3 is a cross sectional view taken along line III-III of FIG. 2.
Figure 4A:
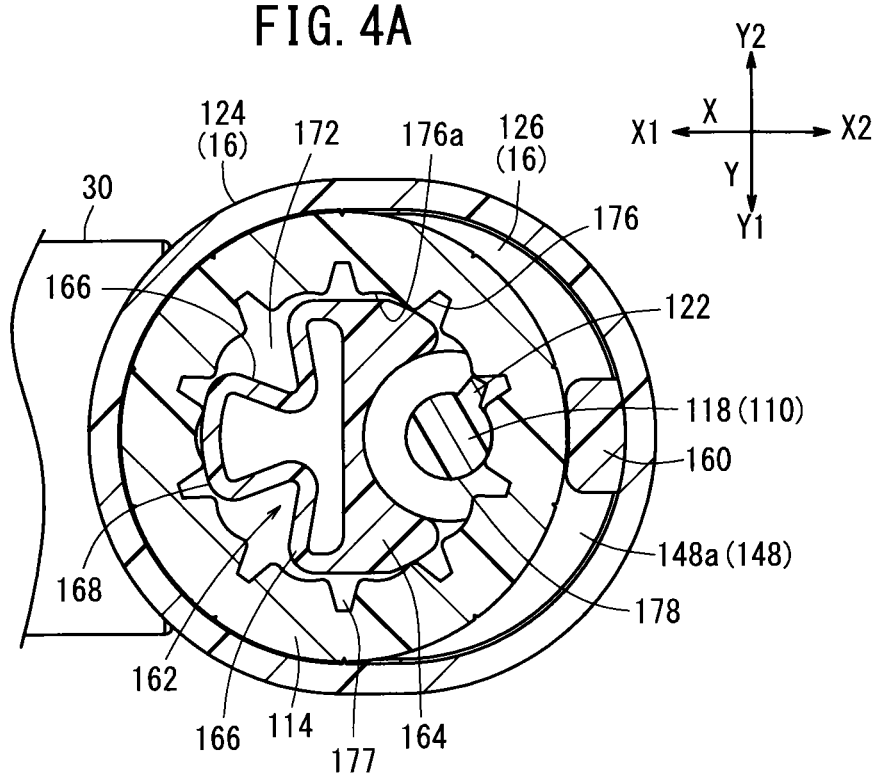
FIG. 4A is a cross sectional view taken along line IVA-IVA of FIG. 3.
Figure 4B:
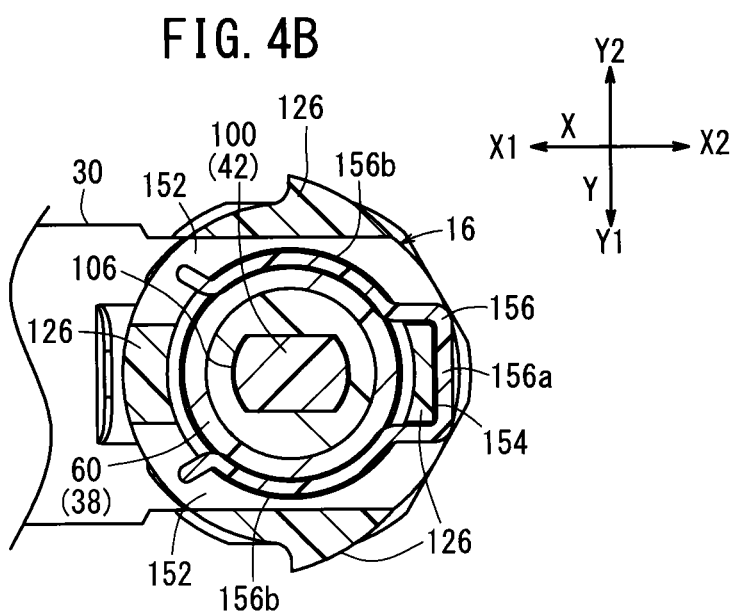
FIG. 4B is a cross sectional view taken along line IVB-IVB of FIG. 2.

FIG. 3 is a cross sectional view taken along line III-III of FIG. 2. FIG. 4A is a cross sectional view taken along line IVA-IVA of FIG. 3, and FIG. 4B is a cross sectional view taken along line IVB-IVB of FIG. 2.

As shown in FIGS. 1 through 3, the housing 26 that constitutes the flow rate control valve 14 is formed by a first body 36 having the first port 28, and a second body 38 having the second port 30 and which is attached to the first body 36. In the interior of the first and second bodies 36, 38, a flow passage 40 is formed through which the fluid flows from the first port 28 to the second port 30. Further, in the interiors of the first and second bodies 36, 38, a needle valve 42 (displacement member) displaceable with respect to the flow passage 40 is disposed. The needle valve 42 functions to control, by displacement thereof, the flow-through state of the fluid that flows through the flow passage 40. In FIG. 3, a closed state is shown in which the flow passage 40 is blocked by the needle valve 42.

The first body 36, for example, includes a main tubular portion 44, which is formed as a tubular body from a resin material, and the first port 28 is provided on the lower side of the main tubular portion 44. Threads 28a with which the first pipe 32 is screw-engaged are engraved on the outer circumferential surface of the first port 28. Further, a first port side flow path 46 through which the fluid can flow is formed along the axial center (Z direction) in the interior of the first port 28.

The main tubular portion 44 is formed with a larger diameter than the first port 28 and extends upwardly and downwardly. The lower side of the main tubular portion 44 is formed with a substantially hexagonal shape in cross section, and the upper side thereof is formed with a circular shape in cross section. A valve element accommodating chamber 48 that communicates with the first port side flow path 46 is formed in the interior of the main tubular portion 44. A second body 38 and a check valve 50 are arranged in the valve element accommodating chamber 48. On a lower interior wall of the first body 36 that makes up the valve element accommodating chamber 48, a tapered step part 52 is formed, which is obliquely reduced in diameter and is connected to the first port side flow path 46.

Further, a first body side accommodating space 54, in which a portion of the second body 38 is accommodated, is formed on an upper part of the valve element accommodating chamber 48. On an interior wall of the main tubular portion 44 that makes up the first body side accommodating space 54, a connection hook 44a is formed that projects toward the inside. The connection hook 44a is hooked onto a hooking part 64a of the second body 38, whereby the first body 36 and the second body 38 are interconnected.

The second body 38, which is connected to the first body 36, for example, is formed from a resin material similar to that of the first body 36. The second body 38 includes a tubular body portion 56, which makes up the external appearance of a vertical central portion of the flow rate control valve 14, a projecting tubular portion 58 that projects downwardly from a lower end side of the tubular body portion 56, the second port 30, which extends in the X1 direction while being connected to an outer circumferential surface of the tubular body portion 56, and an insertion tube portion 60 that projects upwardly from an upper part of the tubular body portion 56.

The tubular body portion 56 is formed with a downwardly oriented double tubular structure, which is provided with an inner tube 62 that extends vertically, and an outer tube 64 that extends vertically on the outer side of the inner tube 62, and between the tubes, an annular flow path 66 is provided through which the fluid can flow. A sliding space 68 in which the needle valve 42 is capable of sliding is formed in the interior of the inner tube 62. A stepped portion 70 that projects radially inward, and a communication opening 72, which is formed on the lower side of the stepped portion 70 and communicates with the annular flow path 66, are provided on an inner wall of the inner tube 62 that constitutes the lower side of the sliding space 68. The stepped portion 70 defines a displacement limit in the downward direction of the needle valve 42. The communication opening 72 establishes communication between the sliding space 68 and the annular flow path 66, whereby the fluid is capable of flowing therethrough.

The outer tube 64 surrounds the inner tube 62 while sandwiching the annular flow path 66 therebetween, and the second port 30 is connected on a side surface in the X1 direction. Further, on the outer circumferential surface near the lower part of the outer tube 64, there are formed a hooking part 64a, which is engaged with the connection hook 44a of the first body 36, and a groove 64b, which is engraved along the circumferential direction of the outer tube 64 on a lower side of the hooking part 64a. An annular seal member 74 is installed in the groove 64b, in a connected condition of the first and second bodies 36, 38. The first and second bodies 36, 38 are connected in an airtight (or liquid-tight) manner through engagement of the connection hook 44a and the hooking part 64a, and installation of the seal member 74.

The projecting tubular portion 58 that is connected with the lower side of the tubular body portion 56 projects downward by a predetermined length and is formed smaller in diameter than the tubular body portion 56. A fluid guiding passage 76 extends vertically in the interior of the projecting tubular portion 58, and an upper portion of the fluid guiding passage 76 communicates with the sliding space 68 inside the tubular body portion 56.

A flange 78, which first expands in diameter toward a radial outer side and then is reduced in diameter in a downward tapered shape, is formed on a lower part of the projecting tubular portion 58. The lower end surface of the flange 78 is arranged in proximity to the tapered step part 52 of the first body 36, in a condition in which the first and second bodies 36, 38 are connected. Further, the flange 78 includes four cutout fluid flow grooves 78a arranged in four directions (X directions and Y directions). The fluid flow grooves 78a establish communication between the first port side flow path 46 and the valve element accommodating chamber 48.

The check valve 50 is installed on the outer circumferential surface of a body portion (between the tubular body portion 56 and the flange 78) of the projecting tubular portion 58. The check valve 50, for example, is made of an elastic material such as rubber or the like, and is formed in an annular shape surrounding the projecting tubular portion 58. As viewed in cross section, the check valve 50 includes a mounting portion 50a that extends downwardly in a straight line, and a membrane portion 50b that projects in an inclined manner radially outward from the mounting portion 50a. The membrane portion 50b, by abutment against an inner wall of the valve element accommodating chamber 48, divides the valve element accommodating chamber 48 into upper and lower sections, and guides the fluid that is supplied from the first port side flow path 46 to flow into the fluid guiding passage 76.

On the other hand, the second port 30 is formed in a tubular shape extending perpendicularly with respect to the axial direction of the tubular body portion 56. A second port side flow path 80 through which the fluid can flow is formed in the interior of the second port 30. The second port side flow path 80 communicates with the annular flow path 66 through a connecting passage 82, which is formed on an end of the second port side flow path 80 in the X2 direction (on the side of the tubular body portion 56).

Further, a joint mechanism 84 for connecting the second pipe 34 (see FIG. 1) through which the fluid is discharged is formed in the second port side flow path 80. The joint mechanism 84 includes a chuck 86, which engages with the second pipe 34 that is inserted into the second port side flow path 80, a guide 88 that is engaged on the inner circumferential surface of the second port 30, a release bush 90 that is displaceable along the guide 88 and releases the engaged condition of the second pipe 34 by the chuck 86, and a packing 92 that abuts against the second pipe 34 and maintains an air-tight (or liquid-tight) condition.

The chuck 86 is formed in a substantially cylindrical shape, for example, by press working a thin plate material made from metal, and comprises pawls 86a, which are inclined radially inward, and a projection 86b, which is bent outwardly in a radial direction. The guide 88 is formed in a substantially cylindrical shape by a similar process to that of the chuck 86, and an outer circumferential surface thereof is disposed in contact with the inner circumferential surface of the second port 30.

The release bush 90 is formed, for example, from a resin material in a cylindrical shape having an insertion hole 94, and is inserted in a slidable manner into the guide 88 and the chuck 86, from an end in the X2 direction up to the body portion. On an end in the X1 direction of the release bush 90, a connecting end 90a is formed that projects radially outward.

The packing 92 is formed in an annular shape, for example, from an elastic material such as rubber or the like, and is arranged inside the second port 30 in an overlapping manner on an end in the X2 direction of the chuck 86. The packing 92 includes an outer surface side bulging portion 92a that abuts against the inner surface of the second port 30, and a seal portion 92b that projects from the inner surface of the packing 92 and slidably contacts the outer surface of the second pipe 34.

In the case that the second pipe 34 is connected, the second pipe 34 is connected simply by insertion thereof deeply into the second port 30 through the insertion hole 94 of the release bush 90. More specifically, when the second pipe 34 is inserted into the second port 30, the pawls 86a of the chuck 86 bite obliquely into the outer surface of the second pipe 34, and the seal portion 92b of the packing 92 comes into contact with and maintaining the second pipe 34 in an air-tight (or liquid-tight) condition. As a result, pulling-out of the second pipe 34 from the second port 30 is strongly prevented. In the case that the connection of the second pipe 34 is to be released, the release bush 90 is made to move in the X2 direction, whereby the release bush 90 overcomes the pawls 86a of the chuck 86, and the second pipe 34 is pulled in the X1 direction. Consequently, the second pipe 34 is easily taken out from the second port 30.

Further, the insertion tube portion 60 is formed to project on the upper surface of the tubular body portion 56 that is contiguous with the second port 30. The casing 16 of the flow rate adjustment indicating device 12 is mounted on the outer side of the insertion tube portion 60. In the interior of the insertion tube portion 60, the sliding space 68 of the tubular body portion 56 extends vertically therethrough, and the sliding space 68 communicates with an opening 68a that is formed on an upper end of the insertion tube portion 60.

Further, on the outer circumferential surface of the insertion tube portion 60, there are formed a thick-walled portion 60a that is expanded radially outward in diameter, and a constricted portion 60b that is recessed radially inward on a lower side of the thick-walled portion 60a. By placing the thick-walled portion 60a in surface contact with the inner circumferential surface of an insertion hole 150 of the casing 16, the connection posture of the flow rate control valve 14 and the flow rate adjustment indicating device 12 is guided.

On the other hand, at the time of connection, a clip 156 enters into and is installed on the constricted portion 60b.

The needle valve 42 is inserted displaceably in the sliding space 68 of the second body 38, which is constructed in the foregoing manner. The needle valve 42 is a solid rod-shaped member that extends in the axial direction (Z direction) of the tubular body portion 56. A flow rate control part 96, a seating part 98, and a shaft 100 are disposed on the needle valve 42 in this order upwardly from a lower portion thereof.

The flow rate control part 96 is formed in a solid cylindrical shape and extends over a predetermined length. Further, the outer diameter of the outer circumferential surface of the flow rate control part 96 is set to enable the needle valve 42 to slide in vertical directions without a gap being formed with respect to the inner circumferential surface of the joint portion between the projecting tubular portion 58 and the tubular body portion 56. In a state in which the needle valve 42 is positioned downwardly (see FIG. 3), by the relationship of the mechanical arrangement of the flow rate control part 96 with respect to the tubular body portion 56 and the projecting tubular portion 58, flow of the fluid is blocked.

Further, the flow rate control part 96 includes notch grooves 102 that are carved from the lower end surface at a predetermined length (e.g., a length of the same degree as the displacement amount of the needle valve 42) along the axial direction of the outer circumferential surface thereof. The notch grooves 102 are provided in a plurality along the circumferential direction, so as to be capable of confronting the communication opening 72 of the second body 38. When the needle valve 42 is displaced from a lower position to an upper position, the notch grooves 102 are brought into communication with the communication opening 72. More specifically, the fluid that flows into the fluid guiding passage 76 of the second body 38 is capable of entering into the communication opening 72 through the notch grooves 102.

The seating part 98 is formed with a circular shape in cross section, is expanded radially outward in diameter from the flow rate control part 96, and is accommodated in the sliding space 68 of the second body 38. An annular groove 98a is formed on the outer circumferential surface of the seating part 98, with an o-ring 104, which prevents the fluid from flowing into the sliding space 68, being installed in the annular groove 98a. Further, the lower end surface of the seating part 98 is arranged to confront the stepped portion 70 that constitutes part of the sliding space 68. The limit of displacement of the needle valve 42 is regulated by abutment between the stepped portion 70 and the seating part 98.

The shaft 100 is formed with a substantially rectangular cross sectional shape having circular arc-shaped portions on both sides in the X direction (see FIG. 4B). The shaft 100 extends a predetermined length in the axial direction, and is accommodated in the sliding space 68. Male threads 106 are engraved on the circular arc-shaped portions of the shaft 100. The male threads 106 are screw-engaged with a nut 108 that is disposed in the interior of the tubular body portion 56 (see FIG. 3). In addition, a rotation transmitting member 110 of the flow rate adjustment indicating device 12, having an advancing/retreating space 120 that matches substantially with the cross sectional shape of the shaft 100, is installed on the shaft 100, which extends from the upper portion of the nut 108.

The flow rate control valve 14 is constructed as described above, and the flow passage 40 for the fluid in the interior thereof is constituted by the first port side flow path 46, the valve element accommodating chamber 48, the fluid guiding passage 76, the sliding space 68, the communication opening 72, the annular flow path 66, the connecting passage 82, and the second port side flow path 80. The needle valve 42, under an action of the flow rate control part 96, blocks communication between the fluid guiding passage 76 and the sliding space 68, and accompanying displacement thereof, places the notch grooves 102 in communication with the sliding space 68. In addition, the flow rate of the fluid is adjusted corresponding to the displacement amount (degree of opening) of the notch grooves 102.

The flow rate adjustment indicating device 12 (casing 16) is mounted detachably on an upper portion of the flow rate control valve 14. The flow rate adjustment indicating device 12, in addition to the aforementioned casing 16 and the knob 18, includes the rotation transmitting member 110 and an indication ring 114, which are provided in the interior of the casing 16.

The rotation transmitting member 110 is a member that operates displacement of the needle valve 42, and extends through the interiors of both the flow rate adjustment indicating device 12 and the flow rate control valve 14. The rotation transmitting member 110 includes a lower side tubular member 116 that extends downwardly from the middle portion in the vertical direction, and an upper side columnar member 118 that extends upwardly from the upper surface of the lower side tubular member 116.

The lower side tubular member 116 is formed with an outer diameter that substantially matches the inner diameter of the sliding space 68. Further, the lower side tubular member 116 contains therein the advancing/retreating space 120 formed in a substantially rectangular cross sectional shape that substantially matches with the cross sectional shape of the aforementioned shaft 100, and in which the needle valve 42 can be vertically displaced upwardly and downwardly. By insertion of the shaft 100 so as to match with the cross sectional shape thereof, the advancing/retreating space 120 engages with the shaft 100 in the direction of rotation, and is capable of transmitting a rotational force from the rotation transmitting member 110 to the needle valve 42. The lower side tubular member 116 is inserted from the opening 68a of the second body 38 until coming into abutment with the nut 108 that is disposed in the interior of the sliding space 68.

The upper side columnar member 118 is formed in a cylindrical shape having a diameter smaller than that of the lower side tubular member 116, extends upwardly through the interior of the casing 16, and is connected to the knob 18 on an upper part thereof. Further, on the outer circumferential surface of the upper side columnar member 118, a meshing portion 122 (see FIG. 4A) that projects radially outward is formed from the upper surface of the lower side tubular member 116 to a predetermined height position. The meshing portion 122 is constituted as an engagement part, which engages with the indication ring 114 that is disposed in the interior of the flow rate adjustment indicating device 12, and includes a function to operate the indication ring 114. This structure will be described later.

As discussed above, the casing 16 is constituted from the extension 20 and the main mechanism accommodating section 22. The main mechanism accommodating section 22 is formed in a three-dimensional shape, the outer profile of which projects outward slightly with respect to the extension 20 in the Y direction (widthwise direction) and the X2 direction, and projects outward significantly in the X1 direction. At a height position where the outer diameter of the main mechanism accommodating section 22 is maximum, as viewed in planar cross section (see FIG. 4A), the outer profile thereof is formed in an oblate shape (a so-called oval shape) that is deviated eccentrically in the X1 direction beyond the axial center of the flow rate control valve 14 (needle valve 42). Further, in the main mechanism accommodating section 22, the casing 16 is capable of being divided into an upper case 124 and a lower case 126.

The upper case 124 is formed in a dome-like shape having an interior space 128 with a predetermined volume in a state of being mounted on the lower case 126. More specifically, the upper case 124 includes, from below to above, a tubular lower attachment portion 130, which engages with respect to the lower case 126, an upper side cover portion 132, which is continuous with the lower attachment portion 130 and is formed with an interior space 128 on the inside thereof, and an upper projecting portion 134, which projects upwardly from an upper surface of the upper side cover portion 132.

The lower attachment portion 130 includes an installation hole 136 having a comparatively large inner diameter, and an upper part of the lower case 126 is inserted into the installation hole 136. Further, engagement openings 138 are formed in the four side surfaces (in Y and X directions) of the lower attachment portion 130. Mounting hooks 158a, 158b of the lower case 126 are inserted into the engagement openings 138.

The upper side cover portion 132 is formed in a bottomed tubular shape having a flat upper surface, and a tapered outer circumferential surface that is gradually reduced in diameter upwardly from a connection location thereof with the lower attachment portion 130. The indication ring 114 is housed rotatably inside (in the interior space 128 of) the upper side cover portion 132. The aforementioned display window 24 is formed on a side surface in the X1 direction of the upper side cover portion 132, such that the graduations 174 of the indication ring 114 can be visually confirmed from the display window 24.

The upper projecting portion 134 is formed in a hollow cylindrical shape having a predetermined inner diameter, the axial center thereof being coincident with the axial center of the flow rate control valve 14. The upper projecting portion 134 is inserted into an inner part of the knob 18 and rotatably supports the knob 18. On the outer circumferential surface of the upper projecting portion 134, a knob rotation regulating member 140 is disposed on an upper side thereof, a first annular projection 142 is formed on a lower side of the knob rotation regulating member 140, the first annular projection 142 being expanded radially outward in diameter therearound, and a second annular projection 144, which is expanded in diameter less than the first annular projection 142, is formed on the lower side of the first annular projection 142. An inner side projection 18a on the lower end of the knob 18 is capable of engaging in a stepwise manner with the first and second annular projections 142, 144.

The knob 18, which is mounted on the upper projecting portion 134, is formed in a bottomed tubular shape with the bottom thereof positioned on the upper surface side. A tubular fitting portion 146 is formed to extend in a downward direction in the center of the upper surface of the tubular interior. The fitting portion 146 is fitted over and fixed to the upper side columnar member 118 of the rotation transmitting member 110, so that the rotational force of the knob 18 is transmitted smoothly to the rotation transmitting member 110.

Plural projection strips 18b, which make it easier for the user to grip the knob 18, are formed on an outer circumferential surface of the wall of the knob 18 that surrounds the fitting portion 146. Further, an abutment portion 147, which is capable of abutting against the knob rotation regulating member 140, is disposed on an upper part of the inner circumferential surface of the knob 18, and the inner side projection 18a, which projects radially inwardly, is disposed on a lower part of the inner circumferential surface.

The knob 18, by changing the vertical position thereof with respect to the upper projecting portion 134, is switched between a rotation capable state and a rotation prohibited state. More specifically, in a state in which the knob 18 is at a downward position of the upper projecting portion 134, and the inner side projection 18a is hooked over the second annular projection 144, the abutment portion 147 of the knob 18 abuts against the knob rotation regulating member 140 to thereby inhibit rotation of the knob 18. In the case that the knob 18 is to be rotated, by pulling up on the knob 18 so that the inner side projection 18a overcomes the second annular projection 144, the abutting state between the abutment portion 147 and the knob rotation regulating member 140 is released. Consequently, the knob 18 becomes rotatable with respect to the upper case 124.

The lower case 126 on which the upper case 124 is mounted includes the aforementioned extension 20 into which the insertion tube portion 60 of the flow rate control valve 14 is inserted, and a pedestal 148, which is contiguous with the upper part of the extension 20 and on which the upper case 124 is mounted. The extension 20 is formed in a tubular shape, and includes the insertion hole 150 in which the insertion tube portion 60 of the flow rate control valve 14 can be inserted. Further, as shown in FIG. 1, the extension 20 includes a pair of installation holes 152, which penetrate through the extension 20 in the X direction, and as shown in FIG. 3, includes a mounting recess 154 that is formed on a side in the X2 direction at a height position which is the same as that of the installation holes 152.

In a state in which the lower end of the extension 20 abuts against the upper surface of the tubular body portion 56 of the flow rate control valve 14, the installation holes 152 and the mounting recess 154 are located at the same height as the constricted portion 60b of the flow rate control valve 14, such that the clip 156 can be inserted from the X2 direction.

As shown in FIG. 4B, the clip 156 includes a connecting portion 156a, which extends at an end portion on the X2 side in a straight line in the Y direction, and a pair of installation retention bars 156b, which extend in the X1 direction from opposite ends of the connecting portion 156a by a predetermined length, and are curved at a curvature that is capable of engaging with the constricted portion 60b of the insertion tube portion 60. When the clip 156 is inserted in the X1 direction from the X2 side of the extension 20, the pair of installation retention bars 156b are inserted through the respective installation holes 152, and the curved portions are placed in close contact with the constricted portion 60b to sandwich the constricted portion 60b elastically therebetween. Further, a structure is provided in which the distal ends of the pair of installation retention bars 156b project obliquely and radially outward, such that when the clip 156 is inserted, the clip 156 can be guided smoothly with respect to the insertion tube portion 60.

In the inserted state of the clip 156, the connecting portion 156a thereof is inserted into the mounting recess 154 of the extension 20, whereby the extension 20 is fixed with respect to the insertion tube portion 60. In this manner, the pair of installation retention bars 156b is engaged with respect to the constricted portion 60b, and by latching of the connecting portion 156a in the mounting recess 154, installation is performed between the flow rate control valve 14 and the flow rate adjustment indicating device 12. Consequently, in the case that the flow rate adjustment indicating device 12 is to be detached and removed from the flow rate control valve 14, simply by pulling out the clip 156 in the X2 direction, the state of engagement between both members can easily be released, and therefore, removal of the flow rate adjustment indicating device 12 can easily be performed.

Further, as shown in FIG. 3, on the outer circumferential surface in the X2 direction of the extension 20, the mounting hook 158a is formed, which is expanded radially outward in diameter with a comparatively large size, and the mounting hook 158a is engaged in the engagement opening 138 on the X2 side of the upper case 124.

The pedestal 148 of the lower case 126 is formed with an outer shape for enabling the lower attachment portion 130 of the upper case 124 to be mounted thereon. The mounting hook 158b is formed to project outwardly on the side in the X1 direction of the pedestal 148. The mounting hook 158b is formed as an upper and lower pair, one of which is inserted into an engagement opening 138, and the other of which presses on the lower end surface of the lower attachment portion 130, such that the lower end part of the upper case 124 is sandwiched therebetween. Although not illustrated, mounting hooks also are formed on both sides in the Y direction of the pedestal 148. More specifically, the mounting hooks 158a, 158b and the non-illustrated mounting hooks are engaged respectively with four engagement openings 138 which are formed in the X directions and the Y directions. As a result, the upper case 124 and the lower case 126 are connected together firmly.

A placement surface 148a on which the indication ring 114 is arranged is formed on the upper surface of the pedestal 148. On the placement surface 148a, there are formed a pair of spacers 160 (see FIG. 4A) that project upwardly on the side in the X2 direction, and a detent 162 (elastic regulating member) that is inserted into the interior of the indication ring 114. The pair of spacers 160 confronts the indication ring 114, and restricts the indication ring 114 from approaching in the X2 direction.

The detent 162 is formed from a location roughly in the center of the placement surface 148a up to the inner surface on the X1 direction side of the indication ring 114, and is constituted as a rotation regulating mechanism for abutting elastically against the indication ring 114 to thereby avoid unnecessary rotation of the indication ring 114.

As shown in FIG. 4A, the detent 162 includes a support section 164, which is disposed continuously to project on the placement surface 148a, a pair of bent and extending sections 166, which extend in the X1 direction from opposite ends in the Y direction of the support section 164, and after first bending inwardly, extend again in the X1 direction, and a bridge section 168, which bridges over the ends of the pair of bend and extending sections 166 on the X1 direction side. By being supported by the support section 164, the bent and extending sections 166 and the bridge section 168 are disposed at a position separated upwardly from the placement surface 148a (see FIG. 3), and are elastically deformable along the X-Y plane. The bridge section 168 of the detent 162 abuts against a portion positioned between inscribed teeth 176 of the indication ring 114, and by elastically pressing the indication ring 114 in the X1 direction, serves to regulate rotation of the indication ring 114.

As shown in FIGS. 3 and 4A, the indication ring 114 is formed in an annular shape having a hole 172 through which the rotation transmitting member 110 is inserted. When the indication ring 114 is arranged on the placement surface 148a, the axial center of the indication ring 114 is offset with respect to the insertion position of the rotation transmitting member 110. Further, the indication ring 114 is formed with a tapered surface, in which the upper side of the outer circumferential surface thereof is slanted. Graduations 174 (indicating section), which indicate the change in the flow rate of the fluid, are printed on the tapered surface. By arranging the annular indication ring 114 eccentrically in the X1 direction in the interior of the casing 16, the graduations 174 are made to face the display window 24 exactly, so that the graduations 174 are clearly visible to the user.

With the indication ring 114 arranged in this state, the rotation transmitting member 110 is inserted through the hole 172, and the detent 162 is arranged on the lower side of the hole 172. On the inner circumferential surface of the indication ring 114 that constitutes the hole 172, multiple (ten are shown in FIG. 4A) inscribed teeth 176 (gears) are formed in the circumferential direction. A tooth gap 177 between the adjacent inscribed teeth 176 is set to an interval that is capable of enabling the meshing portion 122 that is formed on the rotation transmitting member 110 to be inserted (engaged) therein. The indication ring 114 is moved in the direction of rotation by the meshing portion 122 engaging therewith.

The width of the inscribed teeth 176 is of a width such that, after the meshing portion 122 has been inserted into and enmeshed with one of the tooth gaps 177 to thereby move the enmeshed indication ring 114 by a predetermined amount, the meshing portion 122 is pulled out therefrom, and thereafter the meshing portion 122 can make one turn and then be inserted exactly into the next tooth gap 177. The inscribed teeth 176 project radially inward by a predetermined amount, and the side surfaces of the projecting sides thereof are formed with circular arc surfaces 176a, which match substantially with the curvature of (an idling portion 178 of) the rotation transmitting member 110.

On the other hand, the meshing portion 122 is formed to project from the outer circumferential surface of the rotation transmitting member 110 by an amount that matches substantially with the depth of the tooth gaps 177. The outer circumferential surface of the rotation transmitting member 110, which is arranged circumferentially alongside the meshing portion 122, makes up the circular arc shaped idling portion 178 without anything else formed thereon. In a state (non-meshing condition) in which the meshing portion 122 is not enmeshed with the inscribed teeth 176, although the idling portion 178 abuts against the circular arc surfaces 176a, the contact area thereof is small, and thus the rotation transmitting member 110 rotates easily.

The bridge section 168 of the detent 162 is formed with a curvature that is smaller than the curvature of the circular arc surfaces 176a, and is wider than one of the inscribed teeth 176. The bridge section 168 is supported on the bent and extending sections 166 so as to be pushed outwardly in the X1 direction, such that in a state in which the idling portion 178 confronts and abuts against the inscribed teeth 176, the bridge section 168 abuts elastically on both ends of the circular arc surface 176a, and the elastic force thereof is applied appropriately to the indication ring 114. Consequently, the indication ring 114 is sandwiched between the casing 16 (upper side cover portion 132) and the detent 162, and displacement of the indication ring 114 (fluctuation of the graduations 174) is securely prevented.

The configuration of the flow rate adjustment indicating device 12 according to the present embodiment is not limited to the above structural features, and various configurations may be adopted therein that are capable of physically implementing rotation and stoppage of the indication ring 114. Several other configuration examples (first through sixth configuration examples) will be described below.

Figure 5A:
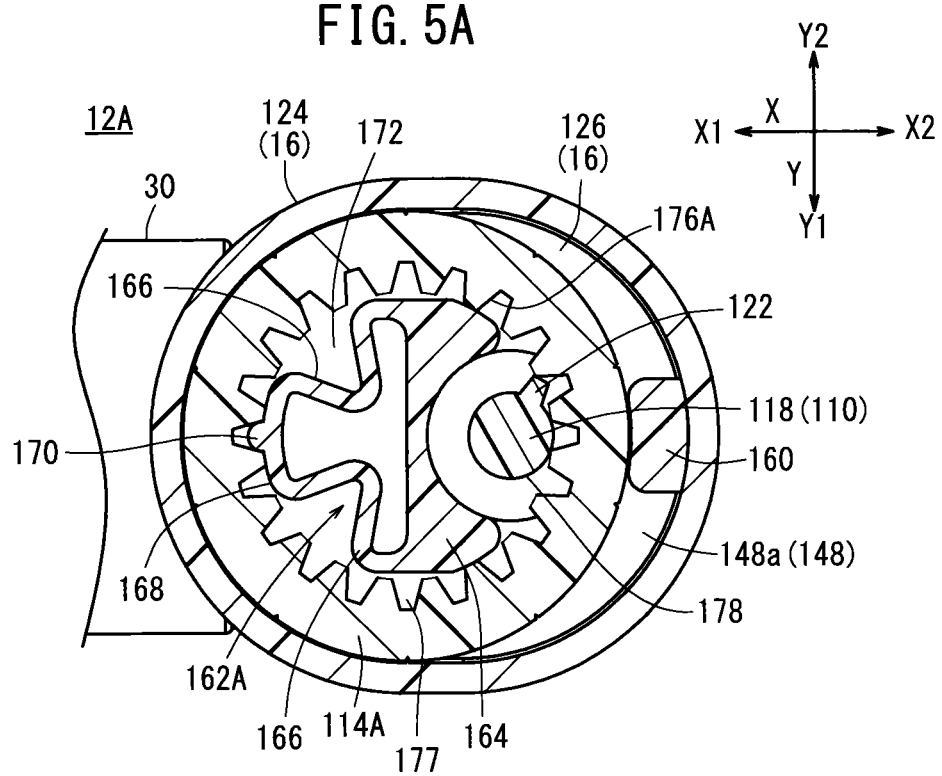
FIG. 5A is a partial cross sectional view showing a first structural example of a flow rate adjustment indicating device.

In a flow rate adjustment indicating device 12A according to a first configuration example shown in FIG. 5A, the number of inscribed teeth 176A formed on an indication ring 114A is set to be twice the number of inscribed teeth 176 (i.e., 20 teeth) formed on the indication ring 114 of the present embodiment. In addition, a projection 170 is formed in a widthwise center portion of the bridge section 168 of a detent 162A. In a non-meshed state between the rotation transmitting member 110 and the indication ring 114A, the projection 170 is inserted into one of the tooth gaps 177, and rotational force of the indication ring 114A is more firmly restricted. Consequently, fluctuation of the graduations 174 in the non-meshed state can be prevented more reliably. Further, when the meshing portion 122 and the inscribed teeth 176A are enmeshed and rotation is transmitted to the indication ring 114A, the projection 170 (bridge section 168) becomes displaced elastically in the X2 direction, and rotation of the indication ring 114A is permitted. Accordingly, the flow rate adjustment indicating device 12A can obtain the same advantages and effects as those of the flow rate adjustment indicating device 12 of the present embodiment.

Figure 5B:
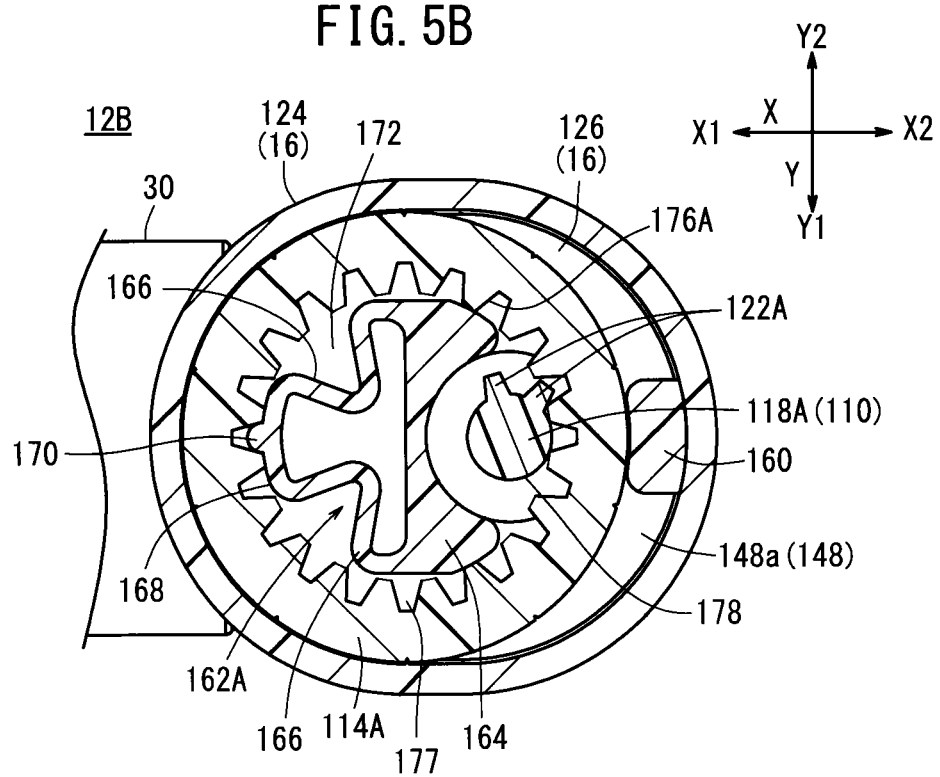
FIG. 5B is a partial cross sectional view showing a second structural example of a flow rate adjustment indicating device.

A flow rate adjustment indicating device 12B according to a second configuration example shown in FIG. 5B differs from the flow rate adjustment indicating devices 12 and 12A, in that a rotation transmitting member 110A has two (a pair of) meshing portions 122A. The indication ring 114A and the detent 162A are the same as those in the flow rate adjustment indicating device 12A according to the first configuration example. The pair of meshing portions 122A are separated by an interval that makes it possible for one of the inscribed teeth 176A of the indication ring 114A to be inserted thereinto, and the pair of meshing portions 122A sandwich one of the inscribed teeth 176A. Consequently, the pair of meshing portions 122A and the inscribed teeth 176A mesh with each other more assuredly, and the indication ring 114A can be made to rotate suitably.

In a flow rate adjustment indicating device 12C according to a third configuration example shown in FIG. 6A, a support section 180 of a detent 162B is formed in a circular arc shape as viewed in plan and is provided continuously on the placement surface 148a. Further, the detent 162B includes an outer side circular arc section 182, which extends in a circular arc shape passing through positions in the vicinity of the plural inscribed teeth 176 and bridges over both ends in the Y direction of the support section 180, an inner side circular arc section 184, which is interposed having a predetermined gap on the inner side of the outer side circular arc section 182, and a projection 170 that is formed on the X1 direction side surface of the outer side circular arc section 182. The projection 170 engages with the inscribed tooth 176 by insertion thereof into a recess (circular arc surface 176a) of the inscribed tooth 176 and presses the indication ring 114. Consequently, in a non-meshed condition, the detent 162B can suitably regulate rotation of the indication ring 114. Further, with the detent 162B, in the case that the outer side circular arc section 182 is flexed inwardly accompanying rotation of the indication ring 114, the outer side circular arc section 182 can be elastically supported by the inner side circular arc section 184.

A flow rate adjustment indicating device 12D according to a fourth configuration example shown in FIG. 6B is equipped with a detent 162C, which is formed substantially the same as the detent 162B according to the third configuration example, however, differs therefrom in that a pair of projections 170A is formed on the outer side circular arc section 182. The pair of projections 170A is formed with an interval capable of sandwiching one of the inscribed teeth 176 therebetween, such that in a non-meshed condition, the projections 170A are inserted respectively into two of the tooth gaps 177 that are adjacent to one of the inscribed teeth 176, and press the indication ring 114. Consequently, in a non-meshed condition, the detent 162C can reliably regulate rotation of the indication ring 114.

Figure 7A:
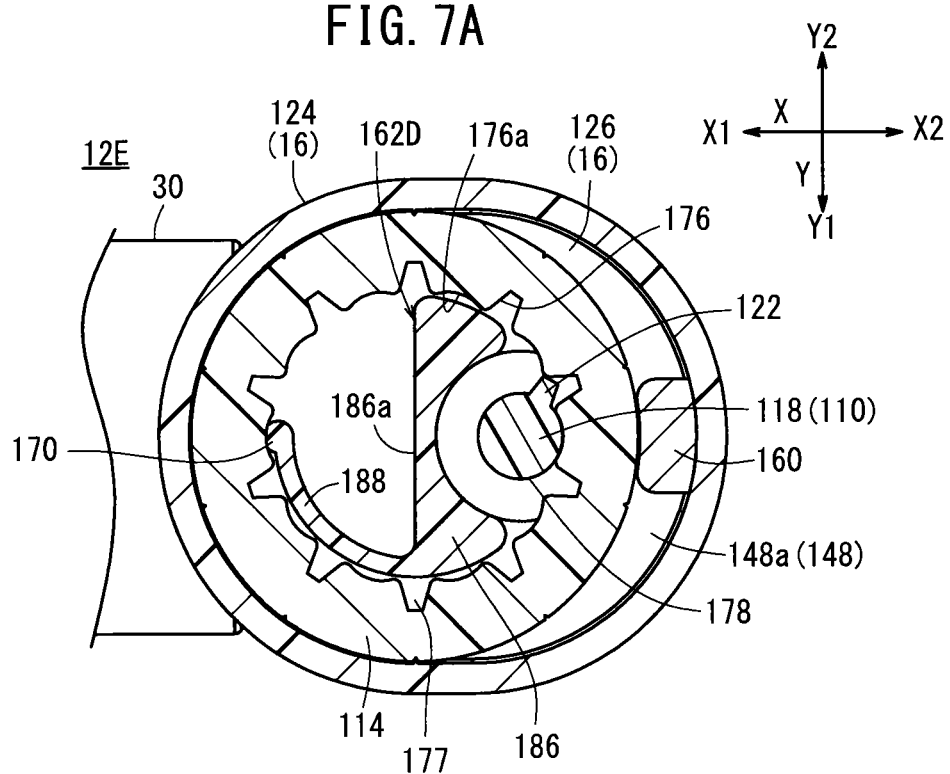
FIG. 7A is a partial cross sectional view showing a fifth structural example of a flow rate adjustment indicating device.

A detent 162D of a flow rate adjustment indicating device 12E according to a fifth configuration example shown in FIG. 7A is made up of a support section 186 having a planar surface 186a in the X1 direction, and a circular arc section 188 formed on one end (an end in the Y1 direction) of the support section 186. The circular arc section 188, similar to the detent 162B of the third configuration example, extends in a circular arc shape passing through positions in the vicinity of the plural inscribed teeth 176, and is formed with a projection 170 on an end positioned in the X1 direction. In a case where the detent 162D is configured in this manner, similarly the recesses (circular arc surfaces 176a) of the inscribed teeth 176 can be pressed by the projection 170, and rotation of the indication ring 114 can suitably be regulated.

Figure 7B:
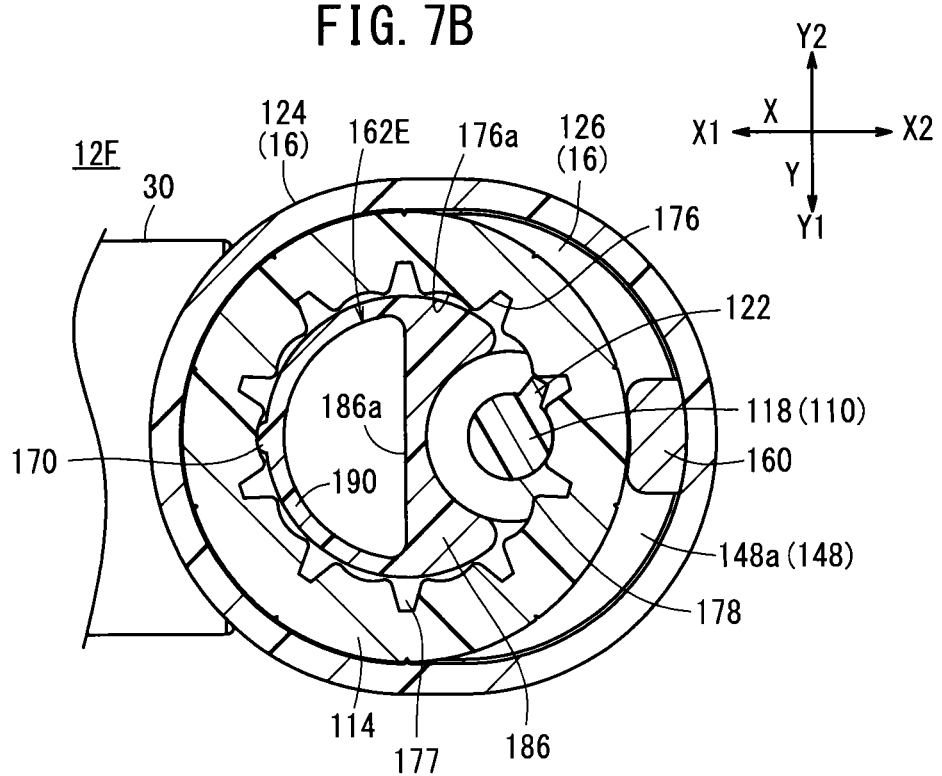
FIG. 7B is a partial cross sectional view showing a sixth structural example of a flow rate adjustment indicating device.

A detent 162E of the flow rate adjustment indicating device 12F according to a sixth configuration example shown in FIG. 7B differs from the detent 162D according to the fifth configuration example, in that a circular arc section 190 is constructed to bridge across both ends in the Y direction of the support section 186 having the planar surface 186a in the X1 direction. The projection 170 is formed on a side surface in the X1 direction of the circular arc section 190. With this structure as well, the same advantages and effects as those of the detents 162A to 162D according to the first through fifth configuration examples can be obtained.

The flow rate control device 10 according to the present embodiment is constructed basically as described above. Operations and advantages of the flow rate control device 10 will be described below.

Figure 8:
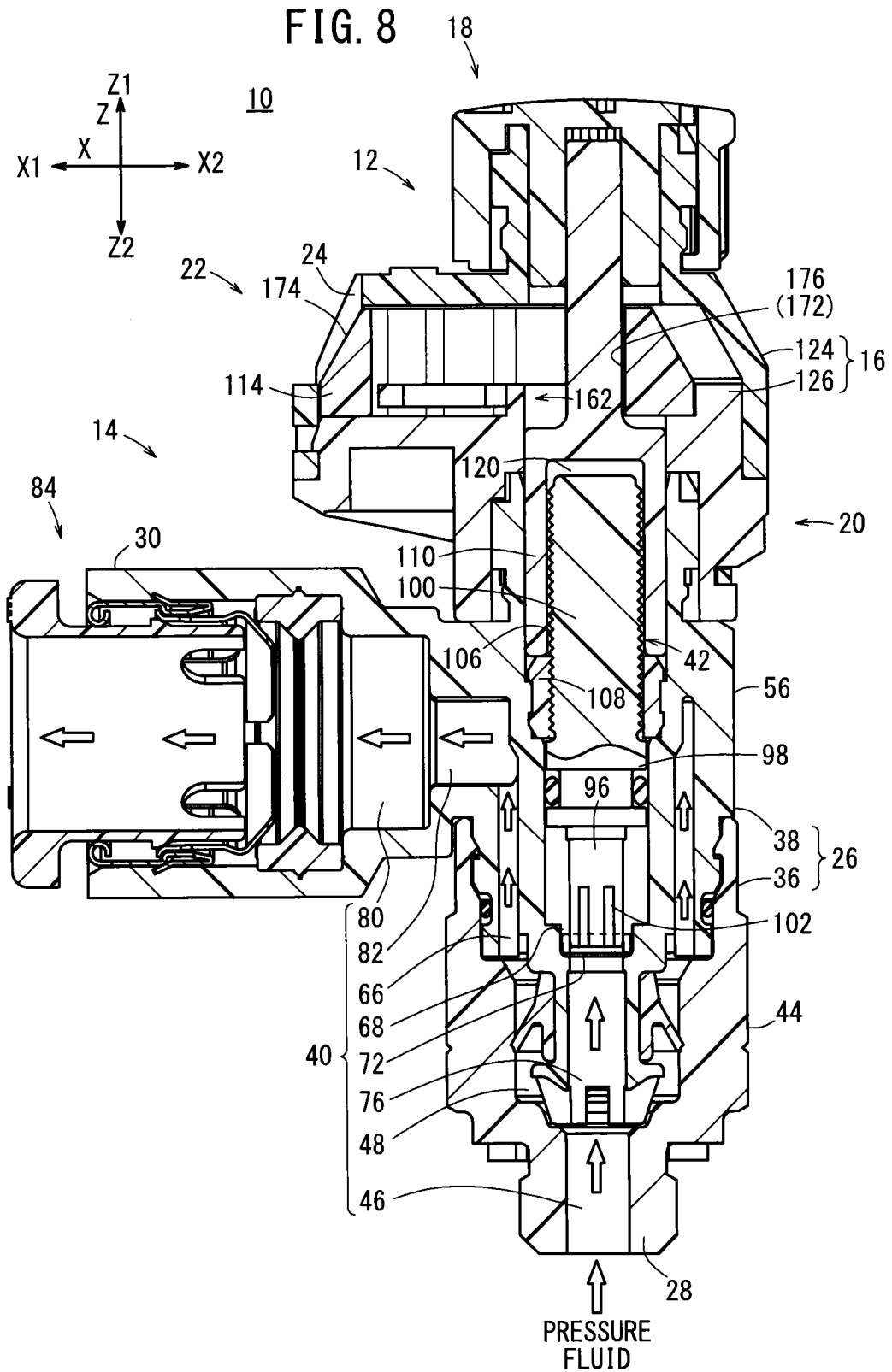
FIG. 8 is a lateral cross sectional view showing a condition in which a needle valve is displaced upwardly, in the flow rate control device of FIG. 3.
Figure 9A:
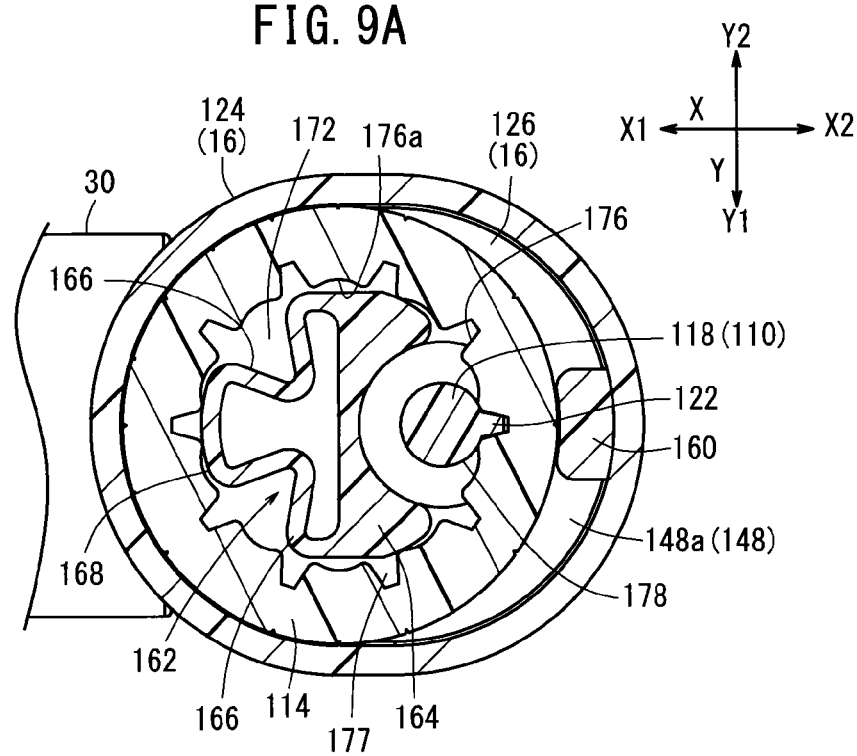
FIG. 9A is a first explanatory illustration showing operations of an indication ring of FIG. 4A.
Figure 9B:
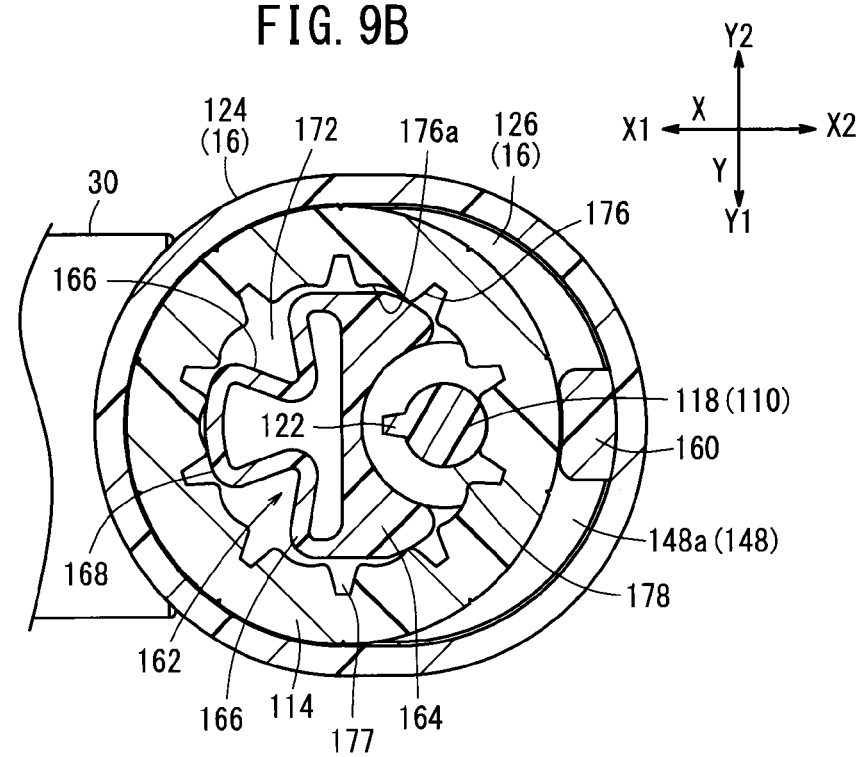
FIG. 9B is a second explanatory illustration showing operations of the indication ring of FIG. 4A.

FIG. 8 is a lateral cross sectional view showing a condition in which the needle valve 42 is displaced upwardly from a condition of the flow rate control device 10 of FIG. 3, FIG. 9A is a first explanatory illustration showing operations of the indication ring 114 of FIG. 4A, and FIG. 9B is a second explanatory illustration showing operations of the indication ring 114 of FIG. 4A. In the following description, at first, comprehensive overall operations of the flow rate control valve 14 will be described with reference to the cross sectional views shown in FIGS. 3 and 8.

In the flow rate control device 10 shown in FIG. 3, a condition is illustrated in which the needle valve 42 is displaced to a lowermost end (in the Z2 direction). In this condition, a closed state is established, in which the flow rate control part 96 of the needle valve 42 is inserted into the fluid guiding passage 76 of the housing 26, whereby communication through the flow passage 40 is blocked. On the other hand, in the flow rate control device 10 shown in FIG. 8, a condition is illustrated in which the needle valve 42 is displaced to an uppermost end (in the Z1 direction). In this condition, an open state is established, in which the lower end of the flow rate control part 96 is displaced in the sliding space 68, and communication through the flow passage 40 is enabled.

As shown in FIG. 3, in the closed state of the flow rate control valve 14, when the pressure fluid is supplied to the first port 28 of the first body 36 through the first pipe 32 from a fluid pressure device (not shown) or the like, the pressure fluid flows into the first port side flow path 46, the valve element accommodating chamber 48, and the lower side of the fluid guiding passage 76. However, in the valve element accommodating chamber 48, the check valve 50 is provided, in which the membrane portion 50b thereof extends outwardly and abuts against an inner surface of the first body 36. Therefore, the pressure fluid that is introduced and flows to the valve element accommodating chamber 48 is prevented from flowing to the downstream side (second port 30 side) by the check valve 50 and the flow rate control part 96.

From the valve-closed state, in the case that a predetermined amount of the pressure fluid is made to flow, an operation is carried out to rotate the knob 18 of the flow rate adjustment indicating device 12 to thereby displace the needle valve 42 upwardly. With this operation, by the user pulling the knob 18 upwardly (in the Z1 direction), the rotation regulated condition by the abutment portion 147 and the knob rotation regulating member 140 is released. At this time, the inner side projection 18a of the knob 18 is moved from the position below the second annular projection 144 to a location between the second annular projection 144 and the first annular projection 142. As a result, a rotation enabled state is brought about.

When the knob 18 is gripped and rotated, the rotation transmitting member 110, which is inserted into the interior fitting portion 146, is rotated integrally therewith, and the rotation of the rotation transmitting member 110 is transmitted to the shaft 100 of the needle valve 42. The male threads 106 of the shaft 100 are screw-engaged with the nut 108, and corresponding to the transmitted rotation amount, linear motion of the shaft 100, i.e., relative displacement in upward and downward directions with respect to the nut 108, is carried out. More specifically, by rotation of the knob 18 in a predetermined direction, the entire needle valve 42 is displaced upwardly (in the direction of the arrow Z1). At this time, due to the cross sectional shapes of the shaft 100 and the advancing/retreating space 120 matching with each other, the needle valve 42 is guided stably in the axial direction of the rotation transmitting member 110.

Consequently, the flow rate control part 96 of the needle valve 42 enters into the sliding space 68, and the notch grooves 102 are placed in confronting relation to the communication opening 72. In the flow rate control valve 14, the flow passage 40 is placed in communication due to the confronting relation between the notch grooves 102 and the communication opening 72, thus allowing the pressure fluid to flow therethrough. As a result, the pressure fluid introduced to the fluid guiding passage 76 is guided to the annular flow path 66 through the notch grooves 102, the sliding space 68, and the communication opening 72, whereupon the pressure fluid flows from the annular flow path 66 and out to the second pipe 34 via the connecting passage 82 and the second port side flow path 80. At this time, a rectified flow of the pressure fluid is promoted by passing through the fluid flow grooves 78a of the flange 78.

The flow rate of the pressure fluid changes in proportion to the amount by which the notch grooves 102 enter with respect to the sliding space 68, and more specifically, in proportion to the displacement amount in the upward direction of the needle valve 42. In a state in which the needle valve 42 is raised and the notch grooves 102 are exposed slightly in the sliding space 68, the flow rate is small, whereas when the needle valve 42 is moved gradually upward, and the notch grooves 102 become gradually more exposed with respect to the sliding space 68, the flow rate of the pressure fluid becomes greater.

As shown in FIG. 8, when the needle valve 42 is displaced sufficiently upward to the movement limit thereof, the lower end surface of the flow rate control part 96 enters into the sliding space 68, and it becomes possible for the pressure fluid to flow at a large amount through the flow rate control valve 14 (flow passage 40).

Further, in the case that the needle valve 42 arrives at a desired flow rate upon displacement thereof, by then moving the knob 18, which has been pulled up, downwardly (in the Z2 direction), rotation of the knob 18 is regulated, i.e., the knob 18 is placed in a locked state.

Consequently, the displacement position of the needle valve 42 is reliably held, and the flow rate of the pressure fluid is maintained. Further, for example, a change in the flow rate of the pressure fluid caused by displacement of the needle valve 42 associated with mistaken rotation of the knob 18 is reliably prevented.

When the flow rate of the pressure fluid is to be adjusted, by the user confirming the graduations 174 of the flow rate adjustment indicating device 12, an operation can be carried out to achieve a desired flow rate. For this purpose, at the interior of the flow rate adjustment indicating device 12, an action is realized to vary the graduations 174 based on the rotational operation of the knob 18.

As shown in FIGS. 4A, 9A and 9B, in the flow rate adjustment indicating device 12, when the knob 18 is rotated by the user, the upper side columnar member 118 of the rotation transmitting member 110 is rotated about its axis, and the meshing portion 122 is rotated integrally therewith. In a condition (non-meshed condition, see FIGS. 4A and 9B) in which the idling portion 178 of the rotation transmitting member 110 abuts with respect to the inscribed teeth 176 on the X2 direction side of the indication ring 114, the indication ring 114 is in a rotation-stopped state. That is, the bridge section 168 of the detent 162 abuts against the inscribed teeth 176 and presses the indication ring 114 in the X1 direction, whereby displacement of the indication ring 114 is regulated. Therefore, the graduations 174 of the indication ring 114 are fixed, and the predetermined value in relation to the flow rate of the pressure fluid continues to be displayed.

In addition, as shown in FIG. 9A, when the rotation transmitting member 110 is rotated, the meshing portion 122 thereof enters into the tooth gap 177 on the side in the X2 direction of the indication ring 114 and meshes with the inscribed teeth 176, and based on rotation of the rotation transmitting member 110, the indication ring 114 is displaced only during the period that the meshing portion 122 is enmeshed with the inscribed teeth 176. At this time, the indication ring 114 overcomes the elastic force of the detent 162 that presses the indication ring 114 in the X1 direction and then the indication ring 114 rotates, whereby the bridge section 168 and the bent and extending sections 166 are elastically deformed in the X2 direction. Moreover, the connected portions between the bridge section 168 and the bent and extending sections 166 are curved, and the circular arc surfaces 176a of the inscribed teeth 176 are easily guided in the direction of rotation while being pressed in the X1 direction. Consequently, the graduations 174 are moved by a constant amount. For example, if the rotation transmitting member 110 is rotated one time, the graduations 174 are displaced by the meshing portion 122 only by an amount corresponding to one of the inscribed teeth 176. As a result, the graduations 174, which have been varied by the amount corresponding to the one rotation of the rotation transmitting member 110, are arranged in the display window 24 of the flow rate adjustment indicating device 12.

As discussed above, according to the flow rate control device 10 of the present embodiment, by arranging the annular-shaped indication ring 114 in the casing 16 such that the center of rotation of the indication ring 114 is offset with respect to the insertion position of the rotation transmitting member 110, the meshing portion 122 of the rotation transmitting member 110 and the indication ring 114 can be placed in direct engagement, and the rotational force of the rotation transmitting member 110 can be transmitted smoothly to the indication ring 114. In other words, it is unnecessary for another member (for example, the gear of Japanese Laid-Open Patent Publication No. 2011-043196) to be interposed between the rotation transmitting member 110 and the indication ring 114. Therefore, a meshing error of the rotation transmitting member 110 with respect to the indication ring 114 can be reduced, and the change in the flow rate of the fluid can be indicated with improved accuracy. Further, since the number of parts that make up the flow rate adjustment indicating device 12 can be reduced, manufacturing costs can be reduced and assembly work can be made more efficient. Furthermore, since the graduations 174 of the indication ring 114 are arranged at a position offset from the knob 18 that is operated by the user, even while the knob 18 is being operated, the graduations 174 are easily observed, and the flow rate can easily be set.

In the flow rate control device 10, by arranging side-by-side on the outer circumferential surface of the rotation transmitting member 110, the meshing portion 122, which is enmeshed with the inscribed teeth 176 of the indication ring 114, and the idling portion 178, which is not enmeshed with the inscribed teeth 176, the indication ring 114 is operated only while the meshing portion 122 is enmeshed with the inscribed teeth 176. Further, in the case that the idling portion 178 is arranged in abutment with the inscribed teeth 176, rotation of the indication ring 114 is stopped, and the flow rate of the fluid can continued to be displayed suitably as a specified value.

Further, by providing the detent 162 continuously with the casing 16, the number of component parts can further be reduced. Furthermore, by the detent 162 elastically pressing one of the inscribed teeth 176 that is positioned on an opposite side across the center of rotation of the indication ring 114 with respect to the position where the rotation transmitting member 110 is arranged, the elastic force can be applied so as to cause the indication ring 114 to approach the rotation transmitting member 110. Thus, the detent 162 can cause the meshing portion 122 and the inscribed teeth 176 to engage more reliably, so that the indication ring 114 can be rotated more suitably.

Still further, the flow rate adjustment indicating device 12 is constituted as a detachable and attachable unit, and by installing the housing 26 and the casing 16 by means of the clip 156, the unit can easily be attached and detached, and furthermore, a plurality of flow rate control valves 14 can be adjusted by one individual unit (flow rate adjustment indicating device 12).

Although a preferred embodiment of the present invention has been described above, the present invention is not limited to the above embodiment, and various modifications can be adopted without departing from the essential scope of the present invention. For example, by attaching the above-described flow rate adjustment indicating device 12 to another apparatus (for example, a pressure reducing valve) that controls the flow of a fluid, the apparatus to which the flow rate adjustment indicating device 12 is attached can be operated.

The invention claimed is:

1. A flow rate control device comprising:
a housing;
a flow passage disposed in an interior of the housing and through which a fluid can flow;
a displacement member, which, by displacement thereof with respect to the flow passage, is capable of controlling a flow rate of the fluid that flows therethrough; and
a flow rate adjustment indicating mechanism that operates displacement of the displacement member, wherein
the flow rate adjustment indicating mechanism includes
a main body portion;
a displacement operating member disposed rotatably with respect to the main body portion and connected to the displacement member, and which causes displacement of the displacement member by a rotating operation of the displacement operating member; and
a rotating member, which is formed in an annular shape having a hole through which the displacement operating member is inserted, the rotating member being arranged in the main body portion such that a center of rotation of the rotating member is offset with respect to an insertion position of the displacement operating member,
the displacement operating member includes an engagement part that is engaged directly with the rotating member under rotation of the displacement operating member,
the rotating member includes an indicating section by which a change in the flow rate of the fluid is indicated along a circumferential direction thereof, and the indicating section is displaced in the circumferential direction by engagement with the engagement part, whereby a position of the indicating section is changed,
plural inscribed teeth are formed along a circumferential direction on an inner circumferential surface of the rotating member that constitutes the hole,
on an outer circumferential surface of the displacement operating member, there are arranged side-by-side along a circumferential direction a meshing portion, which is enmeshed with the inscribed teeth and serves as the engagement part, and an idling portion, which is not enmeshed with the inscribed teeth,
a rotation regulating mechanism, which is capable of regulating rotation of the rotating member in a condition in which the idling portion of the displacement operating member is arranged in confronting relation to the inscribed teeth, is disposed on the main body portion, and
the rotation regulating mechanism is provided continuously within the main body portion, and comprises an elastic regulating member that abuts against the inscribed teeth and elastically presses the rotating member.

2. The flow rate control device according to claim 1, wherein the elastic regulating member includes a projection that is capable of entering recesses formed on inner sides of the inscribed teeth or entering in between the plural inscribed teeth.

3. The flow rate control device according to claim 1, wherein the elastic regulating member elastically presses the rotating member on an opposite side across a center of rotation of the rotating member with respect to a position where the displacement operating member is arranged.

4. The flow rate control device according to claim 1, wherein the flow rate adjustment indicating mechanism is constituted as a unit that is attachable and detachable with respect to the housing.

5. The flow rate control device according to claim 4, wherein:
- the main body portion includes an insertion hole in which the housing can be partially inserted; and
- in a state in which the housing is inserted in the insertion hole, a clip is mounted thereon so as to maintain a connection between the housing and the main body portion.

* * * * *